US011165457B1

(12) United States Patent
Enderby (10) Patent No.: US 11,165,457 B1
(45) Date of Patent: Nov. 2, 2021

(54) BROAD FREQUENCY RANGE TUNER

(71) Applicant: BAE Systems Information and Electronic Systems Integration Inc., Nashua, NH (US)

(72) Inventor: Randall T. Enderby, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/992,473

(22) Filed: Aug. 13, 2020

(51) Int. Cl.
*H04B 1/26* (2006.01)

(52) U.S. Cl.
CPC ..................... *H04B 1/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,068,663 A | * | 11/1991 | Valentine | G01S 7/022 342/20 |
| 2004/0102172 A1 | * | 5/2004 | Hendin | H04B 1/005 455/302 |
| 2014/0378079 A1 | * | 12/2014 | Adnani | H04B 1/406 455/266 |

* cited by examiner

*Primary Examiner* — Junpeng Chen
(74) *Attorney, Agent, or Firm* — Finch & Maloney PLLC (57) ABSTRACT

Techniques are provided for tuning over a broad radio frequency (RF) bandwidth. A tuner implementing the techniques according to an embodiment includes an input module comprising a single-conversion superheterodyne receiver to convert a first RF signal to a processed RF signal by frequency translating from a first frequency range to a lower second frequency range. The input module is also configured to receive a second RF signal occupying the second frequency range and provide the second RF signal as a pass-through RF signal. The tuner also includes a down-conversion module to convert the processed RF signal to a first intermediate frequency (IF) signal by frequency translating the processed RF signal from the second frequency range to a lower third frequency range, and to convert the pass-through RF signal to a second IF signal by frequency translating the pass-through RF signal from the second frequency range to the third frequency range.

20 Claims, 9 Drawing Sheets

BROAD FREQUENCY RANGE TUNER

FIELD OF DISCLOSURE

The present disclosure relates to radio frequency (RF) tuners, and more particularly, to an efficient implementation of a multi-decade RF tuner with reduced component count and power consumption.

BACKGROUND

In many applications, a receiver needs to be tunable over a broad frequency range, and in some cases, many decades of frequency. To provide this wide bandwidth capability, many receiver designs employ multiple sub-receivers that each cover a segment or sub-band of the total desired bandwidth. Each sub-receiver requires many components including filters, mixers, amplifiers, etc., that contribute to the total size, weight, power consumption and cost (SWaPC) of the system. This can be problematic, especially in space-based applications where severe constraints are typically imposed on the SWaPC characteristics of such equipment.

Although the following Detailed Description will proceed with reference being made to illustrative embodiments, many alternatives, modifications, and variations thereof will be apparent to those skilled in the art.

DETAILED DESCRIPTION

Techniques are provided for efficient implementation of a broad frequency range (e.g., multi-decade or other extremely wide bandwidth) RF tuner that does not require multiple fully-configured sub-receivers to cover segments of the total desired or operable bandwidth. Thus, embodiments of the present disclosure employ fewer components which results in reduced size and weight, along with decreased power consumption, compared to the standard multiple receiver approach. A broadband tuner implementing the techniques according to one example embodiment includes a pre-processing stage (e.g., an input module) that employs a single conversion superheterodyne receiver in parallel with a pass-through signal path. The single conversion superheterodyne receiver is configured to perform frequency translation on signals in an upper portion of the operable frequency bandwidth, while the pass-through path is configured to allow signals within a lower portion of the operable frequency bandwidth to pass through without translation. The input module is coupled to a downconverter module (DCM) that is configured to perform an additional frequency translation, on either the translated or the passed-through signals, to shift those signals down to a desired intermediate frequency (IF) range. A frequency plan is also provided, as will be described in greater detail, to enable the components of the disclosed embodiments to function together in the manner described. Numerous variations will be apparent in light of this disclosure.

The disclosed techniques can be used in a wide variety of applications including, for example, space-based systems, communication systems, radars, and electronic warfare systems, although other applications will be apparent. In accordance with an embodiment, a methodology to implement these techniques includes converting, by a single conversion superheterodyne receiver of an input module, a first RF signal to a processed RF signal by frequency translating the first RF signal from a first frequency range to a second frequency range. The second frequency range is lower than the first frequency range. The method also includes providing, by the input module, a received second RF signal occupying the second frequency range, as a pass-through RF signal. The method further includes converting, by the DCM, the processed RF signal to a first IF signal by frequency translating the processed RF signal from the second frequency range to a third frequency range. The third frequency range (e.g., the IF range) is lower than the second frequency range. The method further includes converting, by the DCM, the pass-through RF signal to a second IF signal by frequency translating the pass-through RF signal from the second frequency range to the third frequency range.

It will be appreciated that the techniques described herein may provide improved systems and methods for tuning, compared to systems that utilize multiple fully-configured sub-receivers and thus employ significantly more components such as amplifiers, mixers, and local oscillators which impose significant drawbacks in terms of SWaPC. This is particularly true in space-based applications where the availability of specialized components (e.g., radiation hardened, high reliability) is limited compared to that for components suitable to more benign physical environments. Numerous embodiments and applications will be apparent in light of this disclosure.

System Architecture

Figure 1:
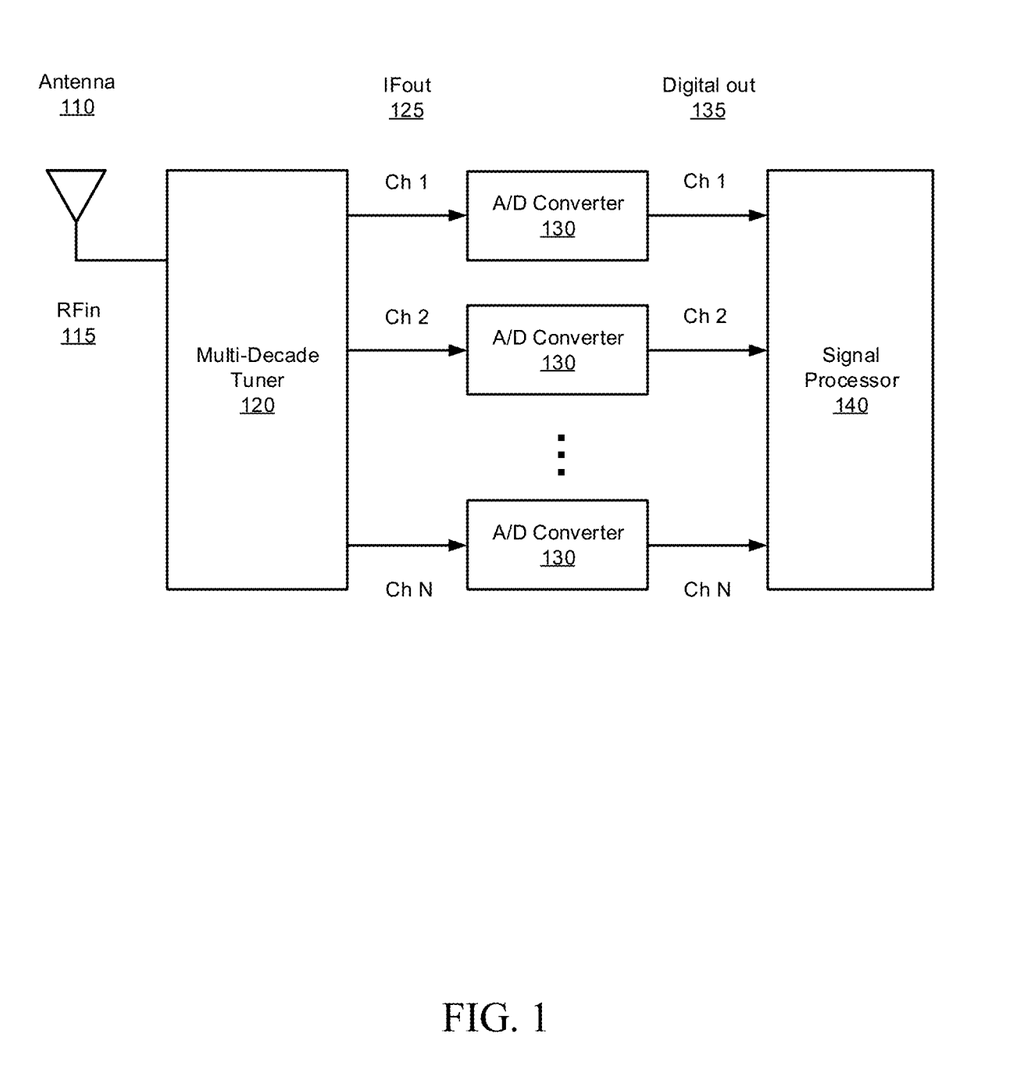
FIG. 1 illustrates deployment of a broad frequency range tuner in a receiver system, in accordance with certain embodiments of the present disclosure.

FIG. 1 illustrates deployment of a multi-decade tuner 120 in a receiver system 100, in accordance with certain embodiments of the present disclosure. The receiver system 100 is shown to include an antenna 110, a multi-decade tuner 120, analog to digital (A/D) converters 130, and a signal processor 140. The multi-decade tuner 120 is configured to receive one or more RF signals, RFin 115, from the antenna 110. The signals may lie anywhere within the frequency range of the tuner 120. The operation of the tuner 120 will be described in greater detail below, but at a high level the tuner is configured to provide one or more IF output channels, IFout 125, which may each contain a signal (or signals) of interest in a particular frequency band associated with that channel. The A/D converters 130 are configured to convert the IF signals 125 to digital signals 135 for further processing by a signal processor 140 or for any other desired purpose. For example, in some embodiments the signals may be communication signals that require demodulation, decoding, analysis, etc. by the signal processor.

In some embodiments, the receiver system 100 may be employed in a space-based application and the tuner 120 may be configured to cover a frequency range from the low end of VHF (30 MHz) to the high end of the Ka band (40 GHz).

Figure 2:
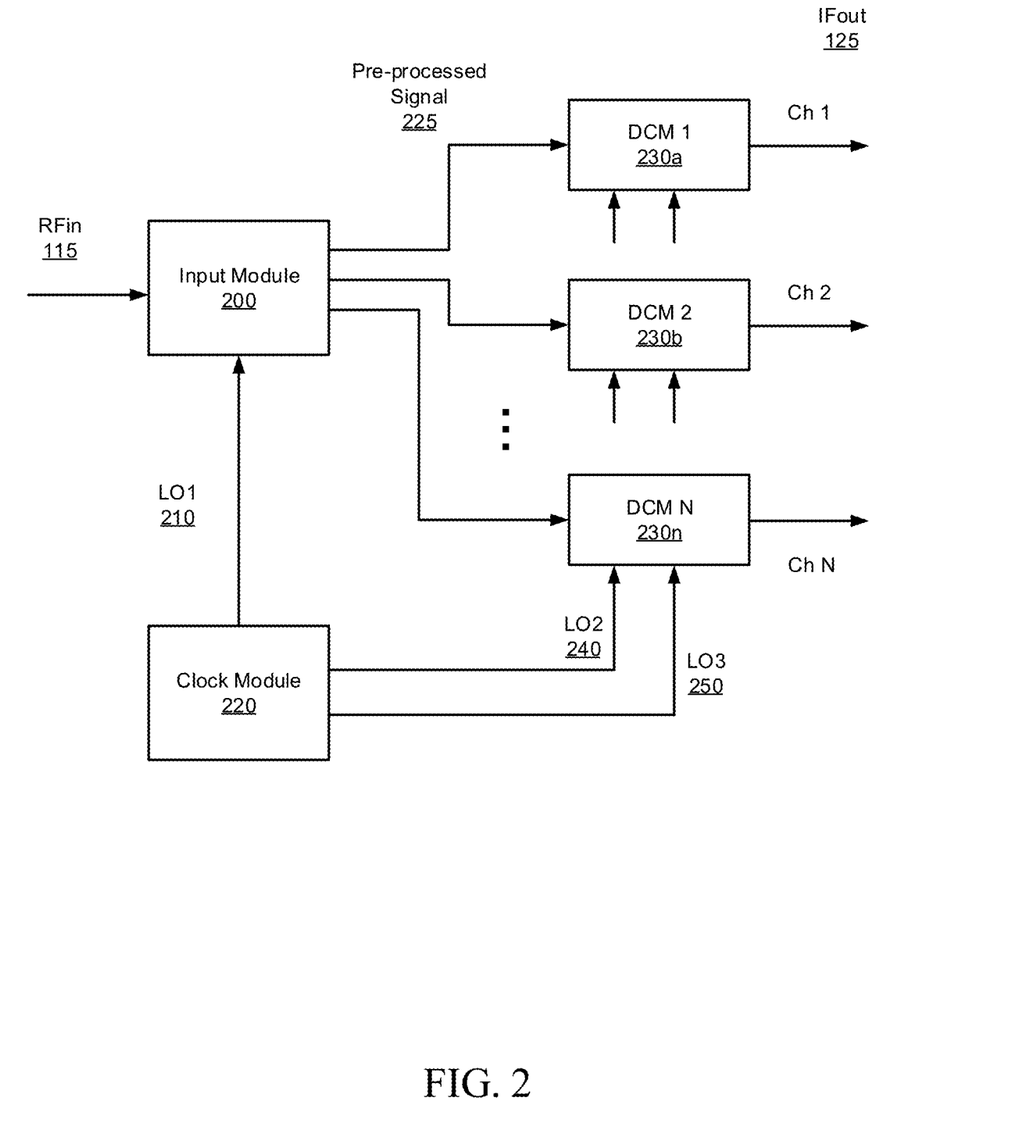
FIG. 2 is a top-level block diagram of a broad frequency range tuner, configured in accordance with certain embodiments of the present disclosure.

FIG. 2 is a top-level block diagram of the multi-decade tuner 120, configured in accordance with certain embodiments of the present disclosure. The multi-decade tuner 120 is shown to include an input module 200, a clock module 220, and one or more down-converter modules (DCMs) 230a-n.

The input module 200 is configured to convert the RFin signal(s) 115 into one or more pre-processed signals 225 using a single conversion superheterodyne receiver driven by a first local oscillator (LO) signal LO1 210.

The DCMs 230a-n are configured to perform additional frequency translation on the pre-processed signals 225 to shift those signals down to a desired intermediate frequency (IF) range, as IFout 125 for channels 1 through N. The DCMs employ one or more LO signals (e.g., LO2 240, LO3 250) to accomplish the frequency translation. The operation of the input module 200 and the DCMs 230 will be described in greater detail below for both a single channel embodiment and a multi-channel embodiment.

The clock module 220 is configured to generate LO signals LO1 210, LO2 240, and LO3 250. In some embodiments, the LO signals may be generated or derived from a common clock reference signal, for example using a phase locked loop circuit or other suitable method, to provide synchronization between the signals. In some embodiments, the clock module may also generate an A/D sample clock for use by the A/D converters 130.

Figure 3:
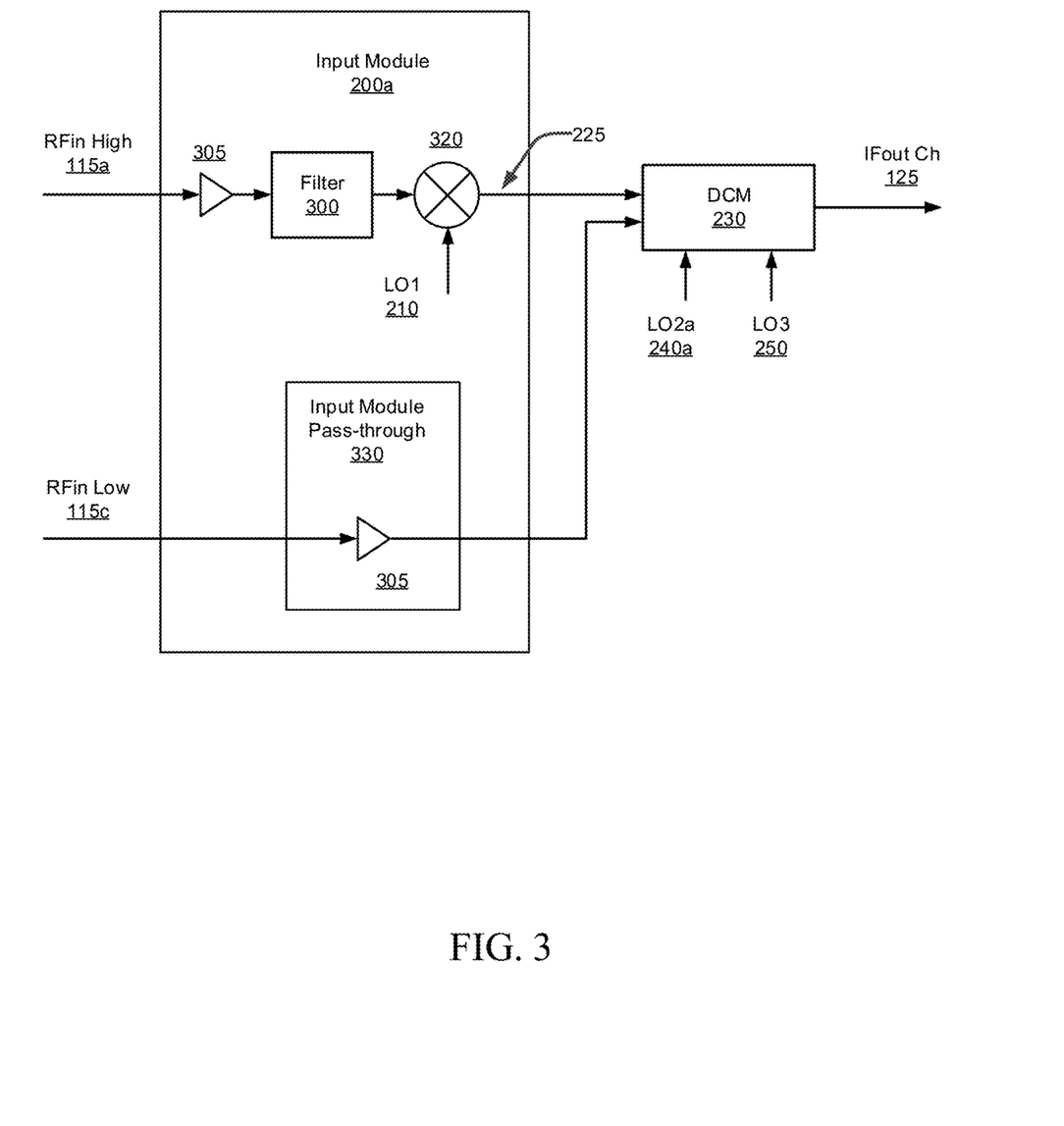
FIG. 3 is a more detailed block diagram of a single channel broad frequency range tuner, configured in accordance with certain embodiments of the present disclosure.
Figure 5:
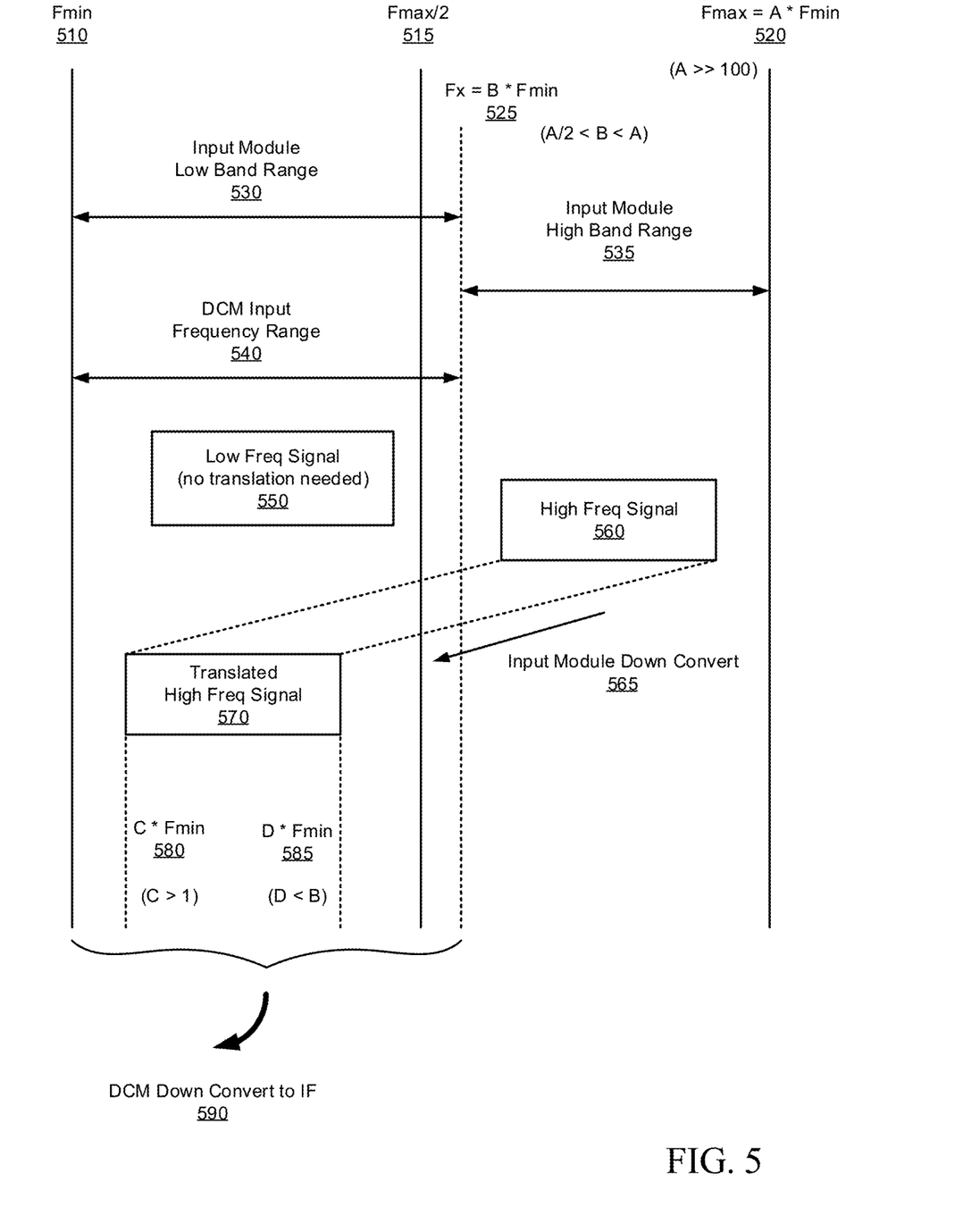
FIG. 5 illustrates a frequency plan for operation of a broad frequency range tuner, in accordance with certain embodiments of the present disclosure.

FIG. 3 is a more detailed block diagram of a single channel multi-decade tuner 120a, configured in accordance with certain embodiments of the present disclosure. In this embodiment, the single channel multi-decade tuner 120a is shown to include an input module 200a and a DCM 230. The input module 200a is shown to include two RF signal paths. A high frequency band RF signal, RFin High 115a, is processed through a first signal path. The first signal path includes an amplifier 305, filter 300 and a single conversion superheterodyne receiver 320, configured to generate processed RF signal 225. Processed RF signal 225 is a filtered and frequency translated version of the high frequency band RF signal 115a, as will be described below in connection with the frequency plan 500 as illustrated in FIG. 5. The amount of frequency translation is based on the supplied LO1 signal 210. Additionally, a low frequency band RF signal, RFin Low 115c, is routed through a second path which is configured as an amplified pass-through path 330. The pass-through path 330 does not subject the low frequency band RF signal 115c to a frequency translation but does provide amplification 305. The processed RF signal 225, and the pass-through RFin Low signal 115c are provided to the DCM 230.

Figure 4:
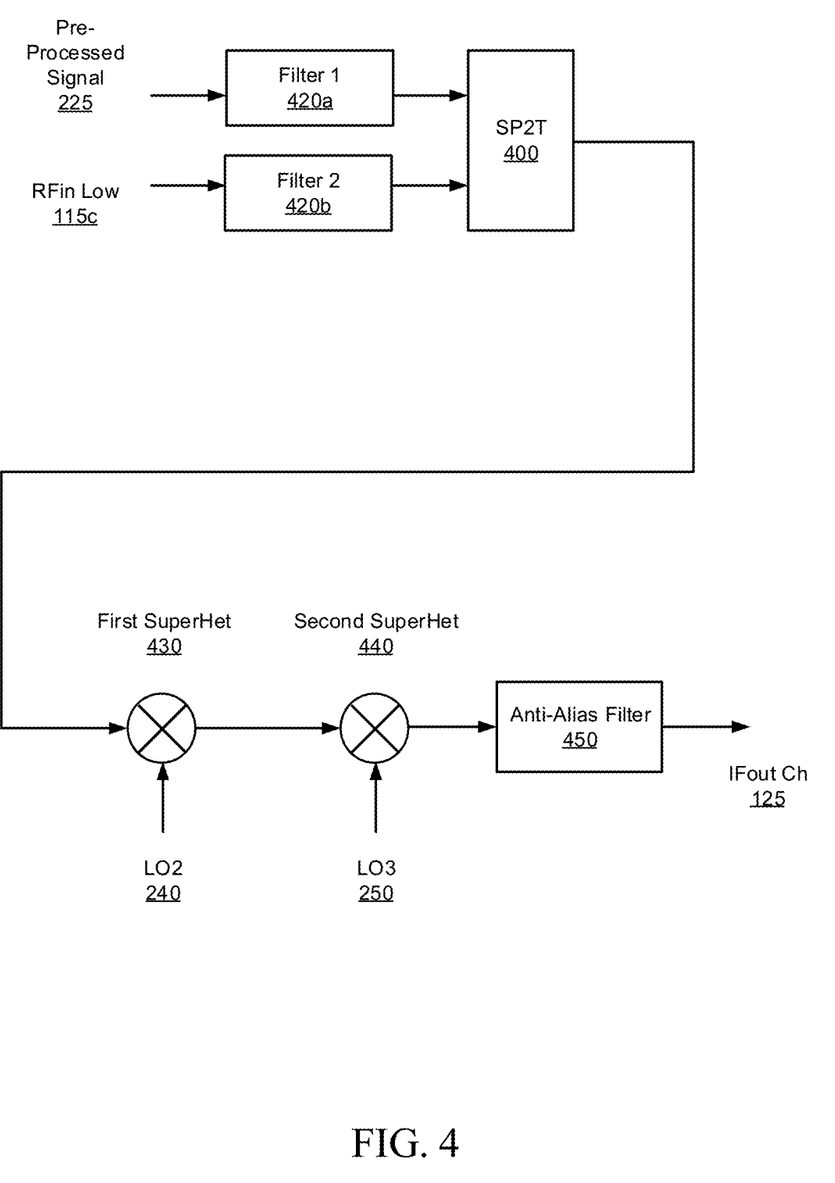
FIG. 4 is a more detailed block diagram of a down-conversion module (DCM) of the broad frequency range tuners of FIGS. 2 and 3, configured in accordance with certain embodiments of the present disclosure.

FIG. 4 is a more detailed block diagram of DCM 230 of the single channel multi-decade tuner 120a, configured in accordance with certain embodiments of the present disclosure. The DCM 230 is shown to include filters 420a and 420b, a single pole double throw (SP2T) switch 400, first and second superheterodyne receivers 430, 440, and an anti-alias filter 450. The series combination of superheterodyne receivers 430 and 440 is sometimes referred to as a double conversion superheterodyne receiver.

Filter 1 420a is configured as a bandpass filter to filter the pre-processed signal 225 to a desired bandwidth. The desired bandwidth may be based on known characteristics of a signal of interest. Similarly, filter 2 420b is configured as a bandpass filter to filter RFin Low 115c to a desired bandwidth. SP2T switch 400 is configured to select between the DCM inputs 225 and 115c, for example, to choose which input will be further processed for conversion to an IF output 125. The double conversion superheterodyne receiver comprising components 430 and 440 is configured to frequency translate or downconvert the selected filtered input signal (225 or 115c) to a desired IF based on the frequencies of LO2 240 and LO3 250. Anti-alias filter 450 is configured to remove the frequency aliased images generated by the frequency mixing performed by the superheterodyne receivers. The resulting signal is provided on IF out channel 125.

FIG. 5 illustrates a frequency plan 500 for operation of the multi-decade tuner 120, in accordance with certain other embodiments of the present disclosure. The operable range of the multi-decade tuner 120 is shown to extend from a minimum frequency Fmin 510 to a maximum frequency Fmax 520, where Fmax is proportional to Fmin. For example, in some embodiments, Fmax=A*Fmin, where A is greater than 100. In a multi-decade tuner A can be significantly greater than 100, which is expressed as A>>100. For example, in some embodiments, the operable frequency range can extend from the low end of VHF (Fmin=30 MHz) to the high end of the Ka band (Fmax=40 GHz), in which case A is greater than 1000.

A frequency boundary Fx 525 is also shown, which is greater than the halfway point 515 (Fmax/2). Fx is defined as B*Fmin, where B is in the range of A/2 to A. Thus, the frequency range from Fmin to Fmax is divided into two regions, the first region extending from Fmin to Fx, and the second region extending from Fx to Fmax.

The first region, extending from Fmin to Fx, corresponds to the input module low band range 530, for which the input signals (RFin Low 115c) are passed-through without frequency translation. The second region, extending from Fx to Fmax, corresponds to the input module high band range 535, for which the input signals (RFin High 115a) undergo a frequency translation. The first region, extending from Fmin to Fx, also corresponds to the DCM input frequency range 540. Thus, as shown, a low frequency signal 550 (e.g. RFin Low 115c) requires no translation and remains in the input module low band range 530 which corresponds to the DCM input frequency range 540. In contrast, a high-frequency signal 560 (e.g., RFin high 115a) is frequency translated or downconverted 565 by the input module single conversion superheterodyne receiver 320, based on the frequency of LO1. This results in a translated high-frequency signal 570 (e.g., the pre-processed signal 225), which is now in the DCM input frequency range 540. The translated high-frequency signal 570 is shown to extend from frequencies C*Fmin 580 to D*Fmin 585, where C>1 and D<B. The DCM then further downconverts 590 the signals 550 or 570 to the desired IF frequency range based on the frequencies of LO2 and LO3.

As a first design criteria, Fx is be chosen to be greater than Fmax/2 so that the high band range 535 can fit into the low band range 530 after just one down conversion 565. However, it is desirable to minimize Fx within this constraint since higher values for Fx generally result in increased cost, RF signal power losses, and DC power consumption.

As a second design criteria, it is also desirable for the LO1 frequency to be chosen to be as large as possible, for example greater than Fmax+Fmin, while still meeting the first design criteria. Increasing C*Fmin, the frequency spacing between Fmax and the frequency of LO1, increases the frequency separation from the desired signal and undesired images, which drives the transition band of the filters (e.g., (B−A/2)*Fmin and (B−D)*Fmin) and thus allows for the use of smaller and lighter filters. There is, however, a trade-off to this, as the increase in the frequency of LO1 comes at a cost of increased size, weight, cost, and power consumption of the system. In some embodiments, the frequency of LO1 is chosen to be (A+C)*Fmin. It can be noted that A*Fmin, (which is Fmax), gets translated to C*Fmin since ((A+C)−A)=C, and B*Fmin gets translated to D*Fmin. Recall that the bandwidth of the input module is (A−B)*Fmin, so the bandwidth of the output of the input module is also (A−B)*Fmin which is also (D−C)*Fmin, and so, (A+C)−B=D.

Figure 6:
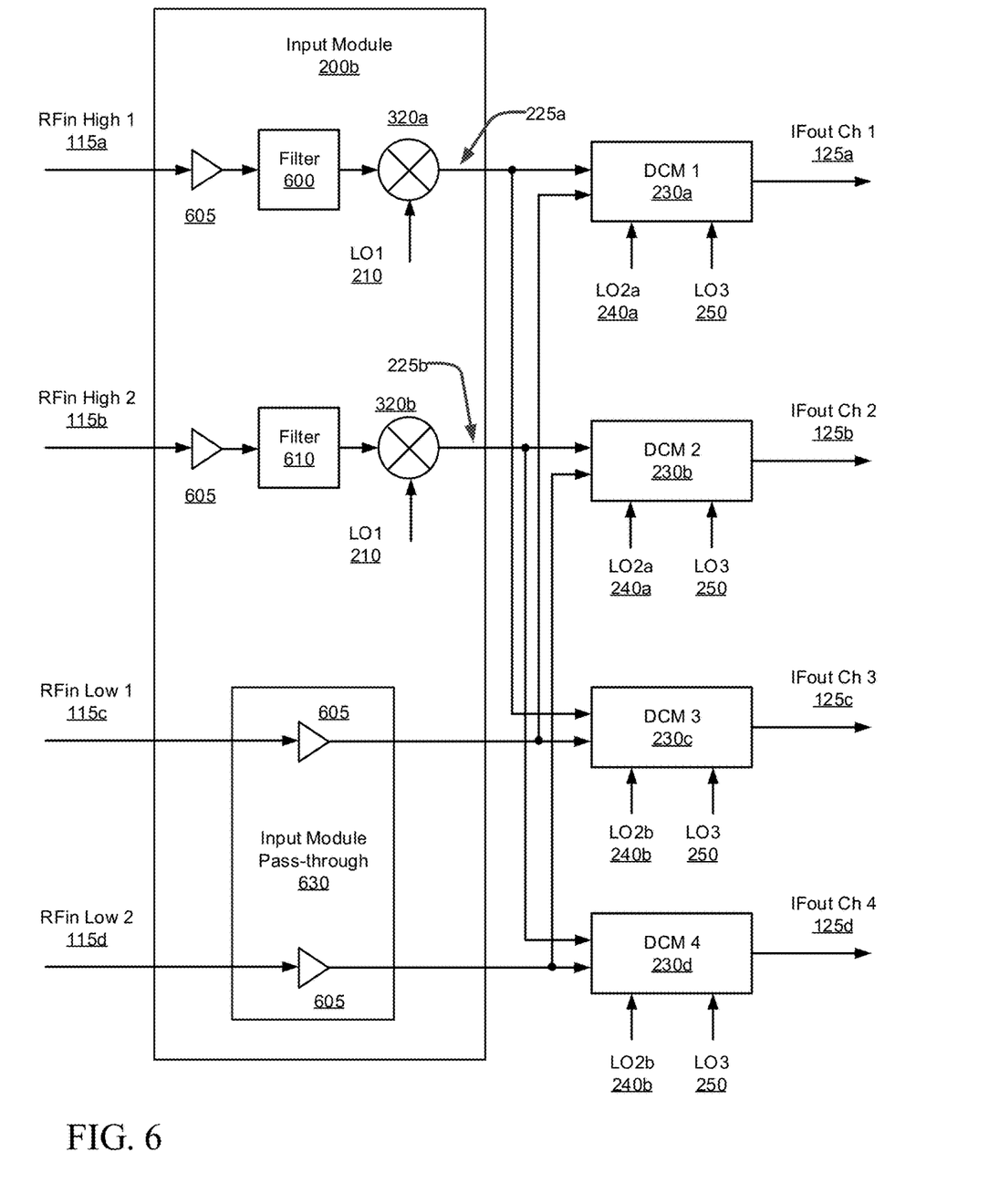
FIG. 6 is a more detailed block diagram of a four channel configuration of a broad frequency range tuner, in accordance with certain embodiments of the present disclosure.

FIG. 6 is a more detailed block diagram of a four channel configuration of the multi-decade tuner 120b, configured in accordance with certain embodiments of the present disclosure. In this embodiment, the four channel multi-decade tuner 120b is shown to include an input module 200b and four DCMs 230a-d. The input module 200b is shown to include four RF signal paths. Two high frequency band RF signals 115a and 115b are processed through signal paths that include amplifiers 605, filters 600, 610, and single conversion superheterodyne receivers 320a, 320b, configured to generate processed RF signals 225a, 225b, respectively. Processed RF signal 225a and 225b are amplified, filtered, and frequency translated versions of the high frequency band RF signals 115a and 115b. The amount of frequency translation is based on the supplied LO1 signal 210 and conforms with the frequency plan 500 described previously in connection with FIG. 5.

Additionally, two low frequency band RF signals 115c and 115d are routed through a pass-through path 630. The pass-through path 630 that provides amplification but does not subject the low frequency band RF signal 115c and 115d to frequency translation. The processed RF signals 225a and 225b, and the pass-through RFin Low signals 115c and 115d are provided to the DCM 230.

In some embodiments, the RF signals 115a-d may be received through different antennas or other signal sources.

Figure 7:
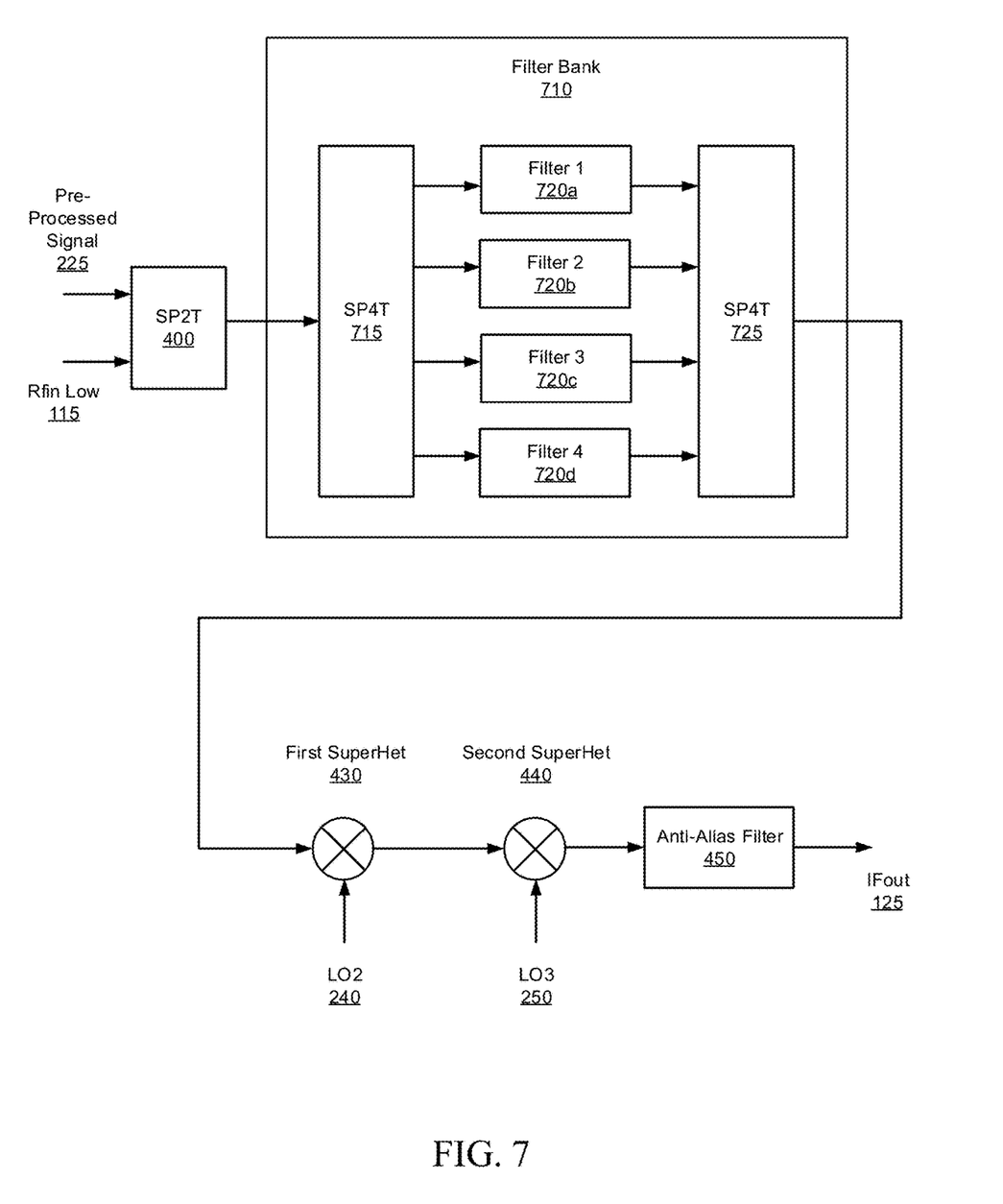
FIG. 7 is a more detailed block diagram of a DCM of the four channel tuner of FIG. 6, configured in accordance with certain embodiments of the present disclosure.

FIG. 7 is a more detailed block diagram of the DCMs 230a-d of the four channel multi-decade tuner 120b, configured in accordance with certain embodiments of the present disclosure. DCMs 230a-d are shown to include an SP2T switch 400, a filter bank 710, a double conversion superheterodyne receiver comprising a first superheterodyne receiver 430 and a second superheterodyne receiver 440, and an anti-alias filter 450. The filter bank 710 is shown to include a single pole four throw (SP4T) switch 715, four band pass filters 720a-d, and another SP4T switch 725.

SP2T switch 400 is configured to select between the DCM inputs 225 and 115, for example, to choose which input will be further processed for conversion to an IF output 125. The filter bank 710 is configured select one of the four filters 720a-d to be switched into the signal path through SP4T switches 715 and 725. The choice of a particular one of the filters 720a-d (e.g., as a bandpass filter) allows for the selection of a desired signal within a particular frequency range, based on known characteristics of each signal of interest. In some embodiments, the filter bank of DCM 1 is switched to filter 1, the filter bank of DCM 2 is switched to filter 2, etc., so that each DCM is configured to process a different signal of interest. In some embodiments, the filters 720 may also be selected based on the setting of switch SP2T 400. These switches and filters provide a broad range of configurability options with respect to the processing of various different signals of interest in different frequency bands within the overall operational range from Fmin to Fmax.

The double conversion superheterodyne receiver comprising components 430 and 440 is configured to frequency translate (e.g., upconvert or downconvert) the selected filtered input signal (225 or 115) to a desired IF based on the frequencies of LO2 240 and LO3 250. Anti-alias filter 450 is configured to remove the frequency aliased images generated by the frequency mixing performed by the superheterodyne receivers. The resulting signal is provided on IF out channel 125

The use of four DCMs (along with the four paths through the input module) provides the capability to process (e.g., tune to) four signals of interest in parallel. This is in contrast to the single channel configuration described previously which can select between two input channel paths but can only process one signal of interest at a time. Although single channel and four channel configurations of the multi-decade tuner have been described and illustrated, it will be appreciated that numerous other configurations, that include any desired number of channels, in various combinations of bandwidths, may be implemented according to other embodiments of the present disclosure.

Methodology

Figure 8:
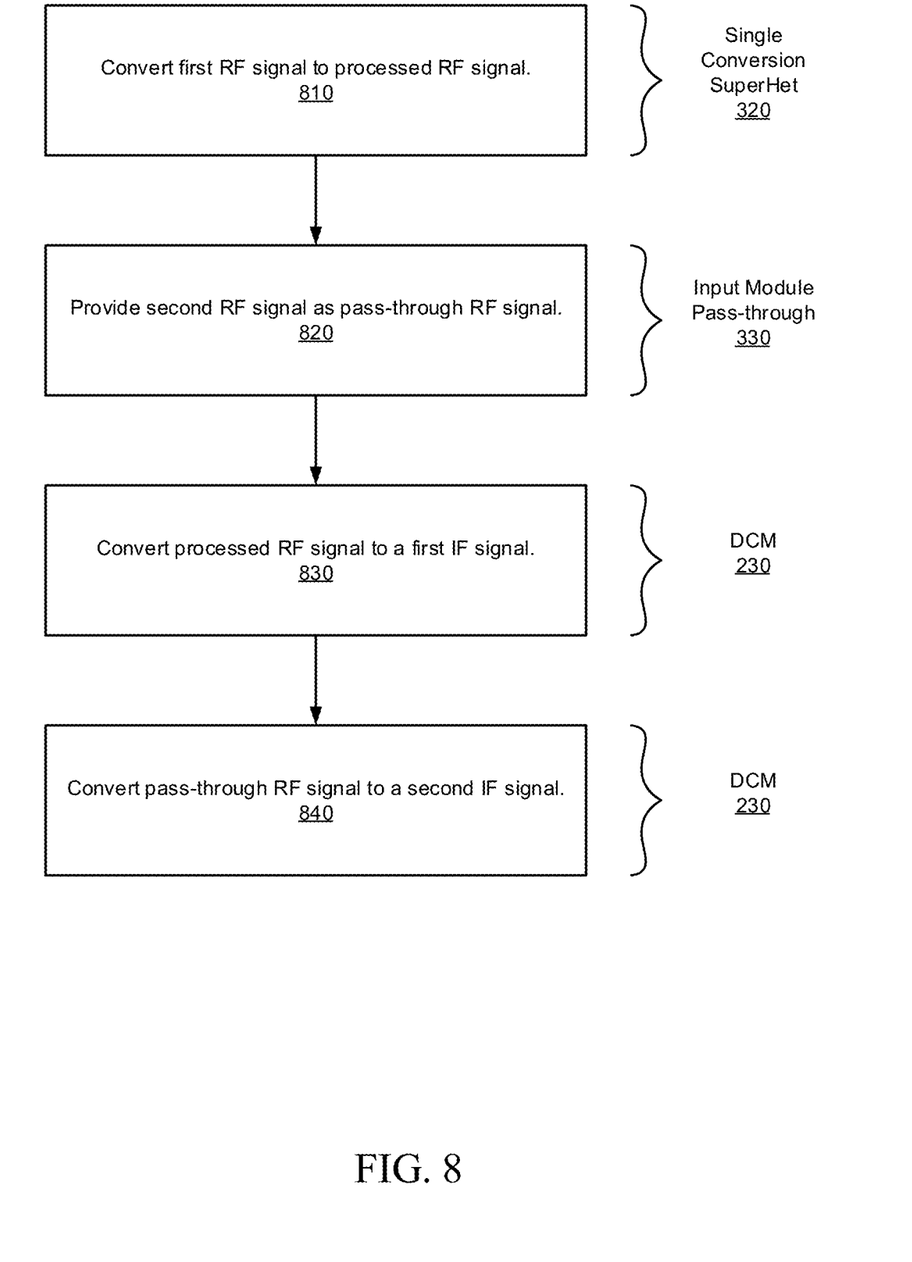
FIG. 8 is a flowchart illustrating a methodology for operation of a broad frequency range tuner, in accordance with an embodiment of the present disclosure.

FIG. 8 is a flowchart illustrating a methodology for operation 800 of the multi-decade tuner 120, in accordance with an embodiment of the present disclosure. As can be seen, example method 800 includes a number of phases and sub-processes, the sequence of which may vary from one embodiment to another. However, when considered in aggregate, these phases and sub-processes form a process for multi-decade tuning, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 8 to the specific components illustrated in FIGS. 1-5 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 8, in one embodiment method 800 commences, at operation 810, by converting a first RF signal to a processed RF signal by frequency translating the first RF signal from a first frequency range to a second frequency range. The second frequency range is lower than the first frequency range. The conversion is performed by a single conversion superheterodyne receiver of an input module of the tuner and the processed (converted) RF signal is provided to the DCM.

Next, at operation 820, a received second RF signal, occupying the second frequency range, is provided by the input module as a pass-through RF signal to the DCM.

At operation 830, the DCM converts the processed RF signal to a first IF signal by frequency translating the processed RF signal from the second frequency range to a third frequency range (e.g., the IF frequency range). The third frequency range is lower than the second frequency range.

At operation 840, the DCM converts the pass-through RF signal to a second IF signal by frequency translating the pass-through RF signal from the second frequency range to the third frequency range (e.g., the same IF frequency range).

Of course, in some embodiments, additional operations may be performed, as previously described in connection with the system. These additional operations may include, for example, switching an input of the DCM to select between the processed RF signal and the pass-through RF signal for performance of the conversion. In some embodiments, the DCM frequency translation is performed by a double conversion superheterodyne receiver.

Figure 9:
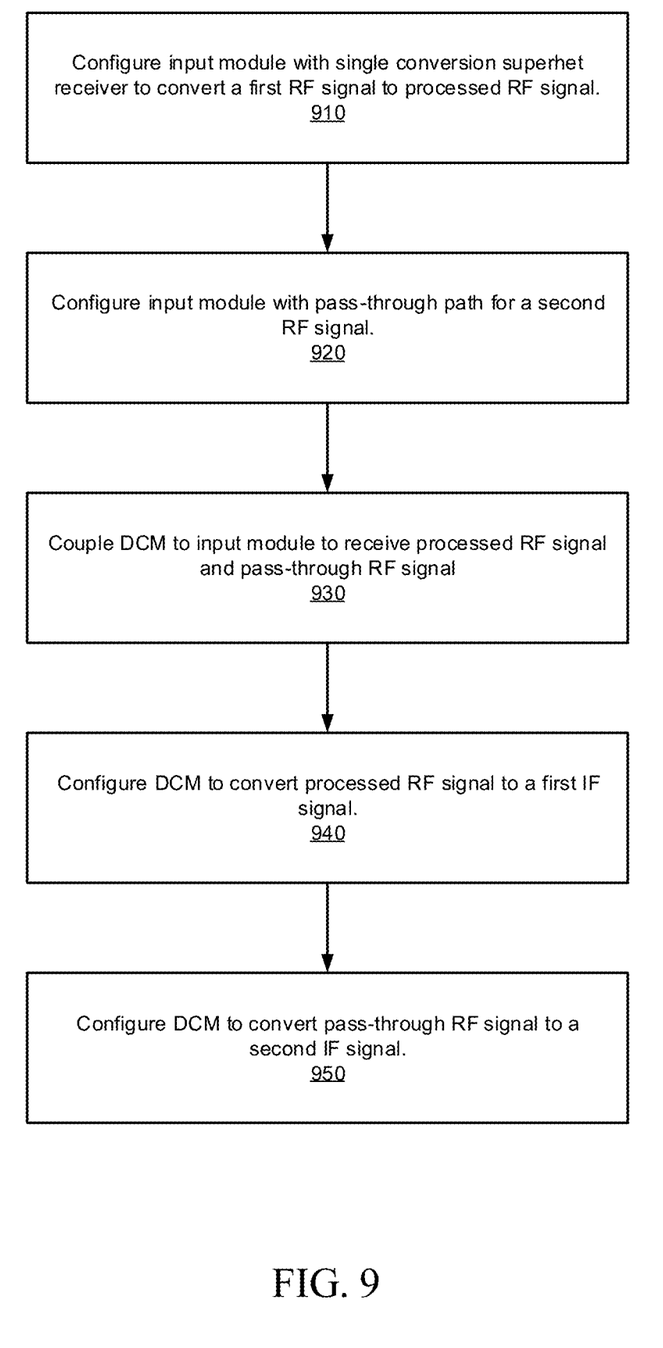
FIG. 9 is a flowchart illustrating a methodology for fabrication of a broad frequency range tuner, in accordance with an embodiment of the present disclosure.

FIG. 9 is a flowchart illustrating a methodology for fabrication 900 of the multi-decade tuner 120, in accordance with an embodiment of the present disclosure. As can be seen, example method 900 includes a number of phases and sub-processes, the sequence of which may vary from one embodiment to another. However, when considered in aggregate, these phases and sub-processes form a fabrication process for the tuner, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. Numerous variations and alternative configurations will be apparent in light of this disclosure.

As illustrated in FIG. 9, in one embodiment method 900 commences, at operation 910, by configuring an input module to include a single conversion superheterodyne receiver to convert a first RF signal to a processed RF signal by frequency translating the first RF signal from a first frequency range to a second frequency range, the second frequency range lower than the first frequency range.

Next, at operation 920, the input module is further configured to include a pass-through path to receive a second RF signal occupying the second frequency range and provide the second RF signal as a pass-through RF signal.

At operation 930, a DCM is coupled to the input module to receive the processed RF signal and the pass-through RF signal.

At operation 940, the DCM is configured to convert the processed RF signal to a first IF signal by frequency translating the processed RF signal from the second frequency range to a third frequency range (the IF frequency range). The third frequency range is lower than the second frequency range.

At operation 950, the DCM is further configured to convert the pass-through RF signal to a second IF signal by frequency translating the pass-through RF signal from the second frequency range to the third frequency range (e.g., the same IF frequency range).

Of course, in some embodiments, additional operations may be performed, as previously described in connection with the system. These additional operations may include, for example, coupling a switch between the input module and the DCM, the switch configured to select between the processed RF signal and the pass-through RF signal for performance of the conversion. In some embodiments, the DCM is configured to include a double conversion superheterodyne receiver to perform the frequency translations.

It will be appreciated that in some embodiments, some of the various components may be combined or integrated in a system-on-a-chip (SoC) architecture. In some embodiments, the components may be hardware components, firmware components, software components or any suitable combination of hardware, firmware or software.

Various embodiments may be implemented using hardware elements, software elements, or a combination of both. Examples of hardware elements may include processors, microprocessors, circuits, circuit elements (for example, mixers, oscillators, filters, amplifiers, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Unless specifically stated otherwise, it may be appreciated that terms such as "processing," "computing," "calculating," "estimating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a tuner comprising: an input module compromising a single conversion superheterodyne receiver configured to convert a first radio frequency (RF) signal to a processed RF signal by frequency translating the first RF signal from a first frequency range to a second frequency range, the second frequency range lower than the first frequency range, the input module further configured to receive a second RF signal occupying the second frequency range and provide the second RF signal as a pass-through RF signal; and a down-conversion module (DCM) configured to convert the processed RF signal to a first intermediate frequency (IF) signal by frequency translating the processed RF signal from the second frequency range to a third frequency range, the third frequency range lower than the second frequency range, the DCM further configured to convert the pass-through RF signal to a second IF signal by frequency translating the pass-through RF signal from the second frequency range to the third frequency range.

In some cases, the DCM comprises a double conversion superheterodyne receiver to perform the frequency translations. In some cases, the DCM comprises a switch configured to select between the processed RF signal and the pass-through RF signal for performance of the conversion. In some cases, the single conversion superheterodyne receiver is a first single conversion superheterodyne receiver and the input module further comprises a second single conversion superheterodyne receiver configured to operate in parallel with the first single conversion superheterodyne receiver to convert a third RF signal to an additional processed RF signal by frequency translating the third RF signal from the first frequency range to the second frequency range. In some such cases, the DCM is a first DCM and the tuner further comprises a second DCM, the second DCM configured to operate in parallel with the first DCM to convert the additional processed RF signal to a third intermediate frequency (IF) signal by frequency translating the additional processed RF signal from the second frequency range to the third frequency range. In some cases, the tuner is operable over a frequency range extending from a lower frequency (Fmin) to an upper frequency (Fmax), wherein Fmax is proportional to Fmin by a first scale factor (A), and A is greater than 100; the first frequency range extends from a medium frequency to Fmax, wherein the medium frequency is proportional to Fmin by a second scale factor (B), and B is equal to one half of A plus an offset frequency, the offset frequency greater than zero; and the second frequency range extends from Fmin to the medium frequency. In some such cases, the input module further comprises a local oscillator (LO) to drive the single conversion superheterodyne receiver, the LO configured to generate an LO signal at a frequency greater than Fmax.

Another example embodiment of the present disclosure provides a method for tuning, the method comprising: converting, by a single conversion superheterodyne receiver of an input module, a first radio frequency (RF) signal to a processed RF signal by frequency translating the first RF signal from a first frequency range to a second frequency range, the second frequency range lower than the first frequency range; providing, by the input module, a received second RF signal occupying the second frequency range, as a pass-through RF signal; converting, by a down-conversion module (DCM), the processed RF signal to a first intermediate frequency (IF) signal by frequency translating the processed RF signal from the second frequency range to a third frequency range, the third frequency range lower than the second frequency range; and converting, by the DCM, the pass-through RF signal to a second IF signal by frequency translating the pass-through RF signal from the second frequency range to the third frequency range.

In some cases, the DCM frequency translation is performed by a double conversion superheterodyne receiver. In some cases, the method further comprises switching an input of the DCM to select between the processed RF signal and the pass-through RF signal for performance of the conversion. In some cases, the single conversion superheterodyne receiver is a first single conversion superheterodyne receiver and the input module comprises a second single conversion superheterodyne receiver, configured to operate in parallel with the first single conversion superheterodyne receiver; and the method further comprises converting, by the second single conversion superheterodyne receiver, a third RF signal to an additional processed RF signal by frequency translating the third RF signal from the first frequency range to the second frequency range. In some such cases, the DCM is a first DCM and the tuner further comprises a second DCM, the second DCM configured to operate in parallel with the first DCM; and the method further comprises converting the additional processed RF signal to a third intermediate frequency (IF) signal by frequency translating the additional processed RF signal from the second frequency range to the third frequency range. In some cases, the tuner is operable over a frequency range extending from a lower frequency (Fmin) to an upper frequency (Fmax), wherein Fmax is proportional to Fmin by a first scale factor (A), and A is greater than 100; the first frequency range extends from a medium frequency to Fmax, wherein the medium frequency is proportional to Fmin by a second scale factor (B), and B is equal to one half of A plus an offset frequency, the offset frequency greater than zero; and the second frequency range extends from Fmin to the medium frequency. In some such cases, the method further comprises generating a local oscillator (LO) signal to drive the single conversion superheterodyne receiver, the LO signal at a frequency greater than Fmax.

Another example embodiment of the present disclosure provides a method for fabricating a tuner, the method comprising: configuring an input module to include a single conversion superheterodyne receiver to convert a first radio frequency (RF) signal to a processed RF signal by frequency translating the first RF signal from a first frequency range to a second frequency range, the second frequency range lower than the first frequency range; configuring the input module further to include a pass-through path to receive a second RF signal occupying the second frequency range and provide the second RF signal as a pass-through RF signal; coupling a down-conversion module (DCM) to the input module to receive the processed RF signal and the pass-through RF signal; configuring the DCM to convert the processed RF signal to a first intermediate frequency (IF) signal by frequency translating the processed RF signal from the second frequency range to a third frequency range, the third frequency range lower than the second frequency range; and configuring the DCM further to convert the pass-through RF signal to a second IF signal by frequency translating the pass-through RF signal from the second frequency range to the third frequency range.

In some cases, the DCM is configured to include a double conversion superheterodyne receiver to perform the frequency translations. In some cases, the method further comprises coupling a switch between the input module and the DCM, the switch configured to select between the processed RF signal and the pass-through RF signal for performance of the conversion. In some cases, the single conversion superheterodyne receiver is a first single conversion superheterodyne receiver and the method further comprises configuring the input module to include a second single conversion superheterodyne receiver to operate in parallel with the first single conversion superheterodyne receiver to convert a third RF signal to an additional processed RF signal by frequency translating the third RF signal from the first frequency range to the second frequency range. In some such cases, the DCM is a first DCM and the method further comprises configuring a second DCM to operate in parallel with the first DCM to convert the additional processed RF signal to a third intermediate frequency (IF) signal by frequency translating the additional processed RF signal from the second frequency range to the third frequency range. In some cases, the tuner is operable over a frequency range extending from a lower frequency (Fmin) to an upper frequency (Fmax), wherein Fmax is proportional to Fmin by a first scale factor (A), and A is greater than 100; the first frequency range extends from a medium frequency to Fmax, wherein the medium frequency is proportional to Fmin by a second scale factor (B), and B is equal to one half of A plus an offset frequency, the offset frequency greater than zero; the second frequency range extends from Fmin to the medium frequency; and the method further comprises providing a local oscillator (LO) to drive the single conversion superheterodyne receiver, the LO configured to generate an LO signal at a frequency greater than Fmax.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A tuner comprising:
an input module compromising a single conversion superheterodyne receiver configured to convert a first radio frequency (RF) signal to a processed RF signal by frequency translating the first RF signal from a first frequency range to a second frequency range, the second frequency range lower than the first frequency range, the input module further configured to receive a second RF signal occupying the second frequency range and provide the second RF signal as a pass-through RF signal; and
a down-conversion module (DCM) configured to convert the processed RF signal to a first intermediate frequency (IF) signal by frequency translating the processed RF signal from the second frequency range to a third frequency range, the third frequency range lower than the second frequency range, the DCM further configured to convert the pass-through RF signal to a second IF signal by frequency translating the pass-through RF signal from the second frequency range to the third frequency range.

2. The tuner of claim 1, wherein the DCM comprises a double conversion superheterodyne receiver to perform the frequency translations.

3. The tuner of claim 1, wherein the DCM comprises a switch configured to select between the processed RF signal and the pass-through RF signal for performance of the conversion.

4. The tuner of claim 1, wherein the single conversion superheterodyne receiver is a first single conversion superheterodyne receiver and the input module further comprises a second single conversion superheterodyne receiver configured to operate in parallel with the first single conversion superheterodyne receiver to convert a third RF signal to an additional processed RF signal by frequency translating the third RF signal from the first frequency range to the second frequency range.

5. The tuner of claim 4, wherein the DCM is a first DCM and the tuner further comprises a second DCM, the second DCM configured to operate in parallel with the first DCM to convert the additional processed RF signal to a third intermediate frequency (IF) signal by frequency translating the additional processed RF signal from the second frequency range to the third frequency range.

6. The tuner of claim 1, wherein:
the tuner is operable over a frequency range extending from a lower frequency (Fmin) to an upper frequency (Fmax), wherein Fmax is proportional to Fmin by a first scale factor (A), and A is greater than 100;
the first frequency range extends from a medium frequency to Fmax, wherein the medium frequency is proportional to Fmin by a second scale factor (B), and B is equal to one half of A plus an offset frequency, the offset frequency greater than zero; and
the second frequency range extends from Fmin to the medium frequency.

7. The tuner of claim 6, wherein the input module further comprises a local oscillator (LO) to drive the single conversion superheterodyne receiver, the LO configured to generate an LO signal at a frequency greater than Fmax.

8. A method for tuning, the method comprising:
converting, by a single conversion superheterodyne receiver of an input module, a first radio frequency (RF) signal to a processed RF signal by frequency translating the first RF signal from a first frequency range to a second frequency range, the second frequency range lower than the first frequency range;
providing, by the input module, a received second RF signal occupying the second frequency range, as a pass-through RF signal;
converting, by a down-conversion module (DCM), the processed RF signal to a first intermediate frequency (IF) signal by frequency translating the processed RF signal from the second frequency range to a third frequency range, the third frequency range lower than the second frequency range; and
converting, by the DCM, the pass-through RF signal to a second IF signal by frequency translating the pass-through RF signal from the second frequency range to the third frequency range.

9. The method of claim 8, wherein the DCM frequency translation is performed by a double conversion superheterodyne receiver.

10. The method of claim 8, further comprising switching an input of the DCM to select between the processed RF signal and the pass-through RF signal for performance of the conversion.

11. The method of claim 8, wherein:
the single conversion superheterodyne receiver is a first single conversion superheterodyne receiver and the input module comprises a second single conversion superheterodyne receiver, configured to operate in parallel with the first single conversion superheterodyne receiver; and
the method further comprises converting, by the second single conversion superheterodyne receiver, a third RF signal to an additional processed RF signal by frequency translating the third RF signal from the first frequency range to the second frequency range.

12. The method of claim 11, wherein:
the DCM is a first DCM and the tuner further comprises a second DCM, the second DCM configured to operate in parallel with the first DCM; and
the method further comprises converting the additional processed RF signal to a third intermediate frequency (IF) signal by frequency translating the additional processed RF signal from the second frequency range to the third frequency range.

13. The method of claim 8, wherein:
the tuner is operable over a frequency range extending from a lower frequency (Fmin) to an upper frequency (Fmax), wherein Fmax is proportional to Fmin by a first scale factor (A), and A is greater than 100;
the first frequency range extends from a medium frequency to Fmax, wherein the medium frequency is proportional to Fmin by a second scale factor (B), and B is equal to one half of A plus an offset frequency, the offset frequency greater than zero; and
the second frequency range extends from Fmin to the medium frequency.

14. The method of claim 13, further comprising generating a local oscillator (LO) signal to drive the single conversion superheterodyne receiver, the LO signal at a frequency greater than Fmax.

15. A method for fabricating a tuner, the method comprising:
configuring an input module to include a single conversion superheterodyne receiver to convert a first radio frequency (RF) signal to a processed RF signal by frequency translating the first RF signal from a first frequency range to a second frequency range, the second frequency range lower than the first frequency range;
configuring the input module further to include a pass-through path to receive a second RF signal occupying the second frequency range and provide the second RF signal as a pass-through RF signal;
coupling a down-conversion module (DCM) to the input module to receive the processed RF signal and the pass-through RF signal;
configuring the DCM to convert the processed RF signal to a first intermediate frequency (IF) signal by frequency translating the processed RF signal from the second frequency range to a third frequency range, the third frequency range lower than the second frequency range; and
configuring the DCM further to convert the pass-through RF signal to a second IF signal by frequency translating the pass-through RF signal from the second frequency range to the third frequency range.

16. The method of claim 15, wherein the DCM is configured to include a double conversion superheterodyne receiver to perform the frequency translations.

17. The method of claim 15, further comprising coupling a switch between the input module and the DCM, the switch configured to select between the processed RF signal and the pass-through RF signal for performance of the conversion.

18. The method of claim 15, wherein the single conversion superheterodyne receiver is a first single conversion superheterodyne receiver and the method further comprises configuring the input module to include a second single conversion superheterodyne receiver to operate in parallel with the first single conversion superheterodyne receiver to convert a third RF signal to an additional processed RF signal by frequency translating the third RF signal from the first frequency range to the second frequency range.

19. The method of claim 18, wherein the DCM is a first DCM and the method further comprises configuring a second DCM to operate in parallel with the first DCM to convert the additional processed RF signal to a third intermediate frequency (IF) signal by frequency translating the additional processed RF signal from the second frequency range to the third frequency range.

20. The method of claim 15, wherein:

the tuner is operable over a frequency range extending from a lower frequency (Fmin) to an upper frequency (Fmax), wherein Fmax is proportional to Fmin by a first scale factor (A), and A is greater than 100;

the first frequency range extends from a medium frequency to Fmax, wherein the medium frequency is proportional to Fmin by a second scale factor (B), and B is equal to one half of A plus an offset frequency, the offset frequency greater than zero;

the second frequency range extends from Fmin to the medium frequency; and the method further comprises providing a local oscillator (LO) to drive the single conversion superheterodyne receiver, the LO configured to generate an LO signal at a frequency greater than Fmax.

* * * * *